UNITED STATES PATENT OFFICE 2,572,310

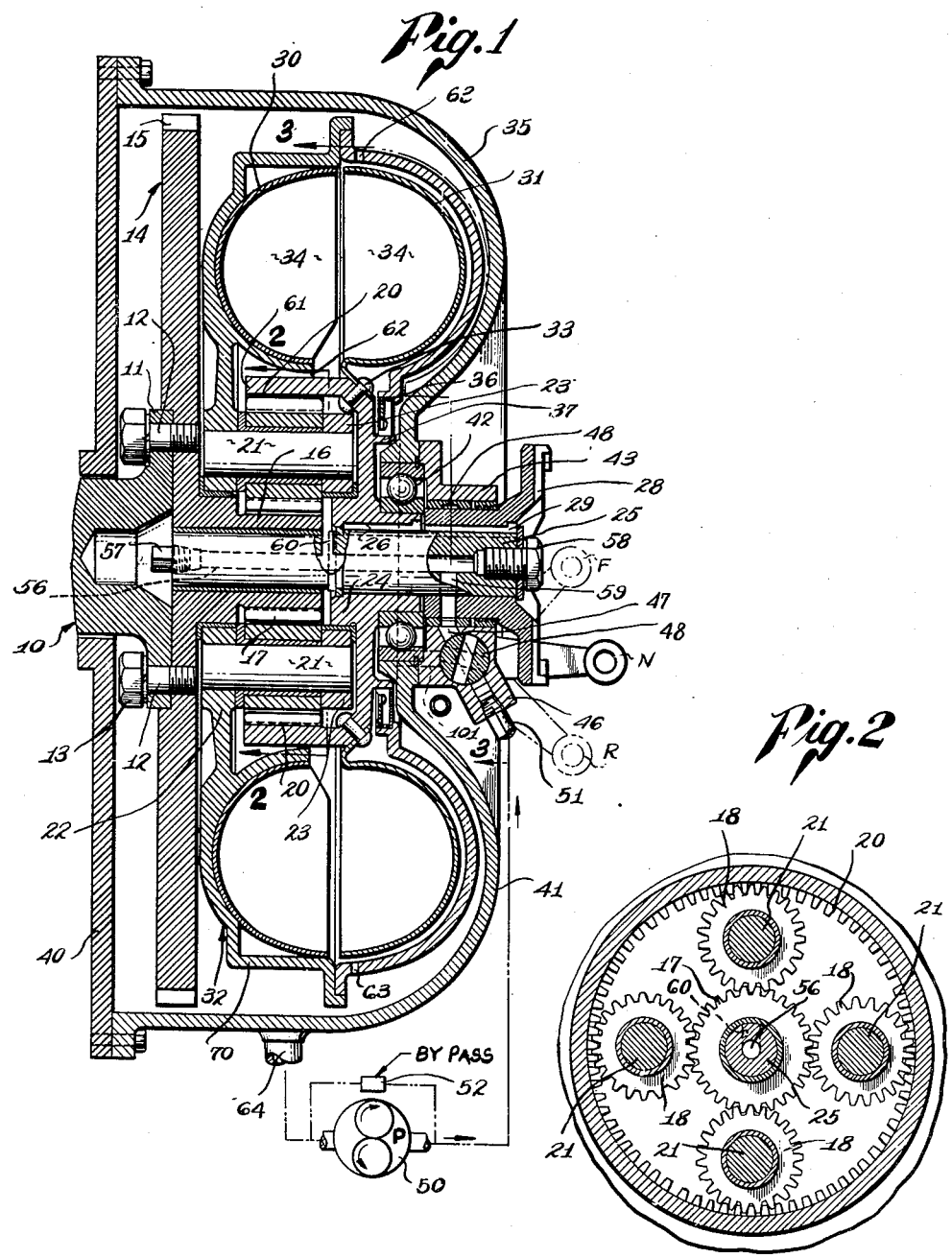

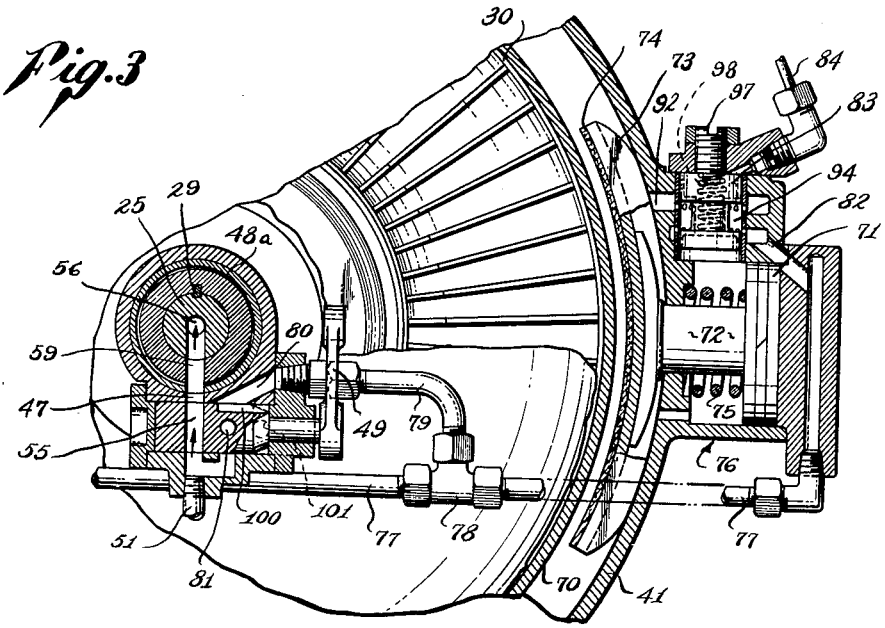
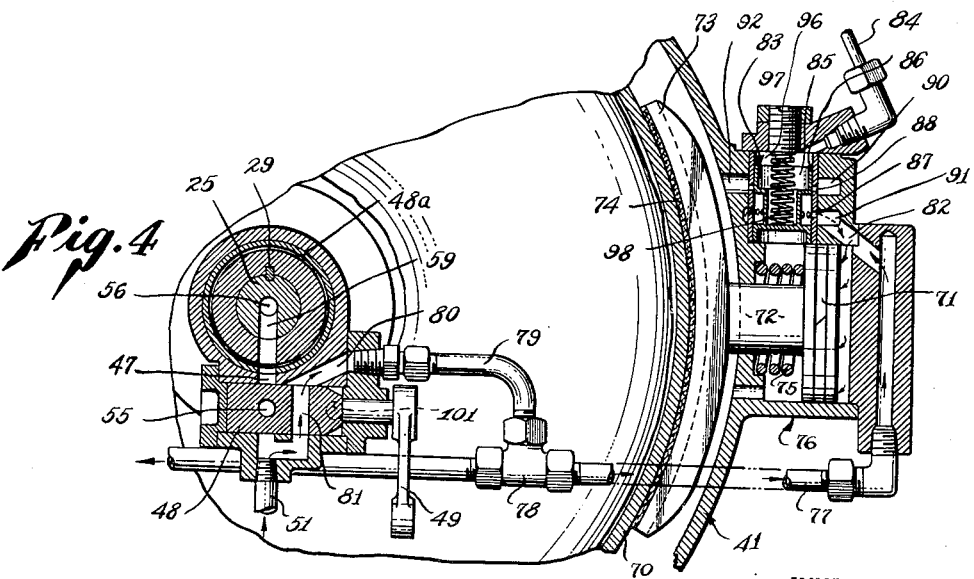
INVENTOR.
JULIAN S. BROWN
BY Fulwider & Mattingly
Attorneys

AUTOMOTIVE TRANSMISSION INCORPORATING HYDRODYNAMIC COUPLINGS

Julian S. Brown, Jacksonville, Fla., assignor of one-half to Stewart W. Munroe, Los Angeles, Calif.

Application May 25, 1950, Serial No. 164,208

12 Claims. (Cl. 74—645)

My invention relates generally to rotary power transmissions, and more particularly, to such devices as used in automobiles.

It is well-known practice in automotive power systems to interpose a speed-reducing transmission between the prime mover and propeller shaft for the purpose of permitting relatively increased speed of the prime mover, thus to increase the power delivered at the propeller without increasing the speed thereat. Such increase in delivered power is due to the well-known fact that the power delivered by any rotary power plant is proportional to the product of the speed and torque of the output shaft. Putting the proposition differently, if either the speed or torque of any power transmitting shaft is increased by a given factor, the power delivered through such shaft is increased by the same factor. Accordingly, when high torque at low speed is required, as for example, during acceleration from a standing start, a speed reducing transmission interposed as above stated permits the engine to turn fast enough to develop the necessary horsepower.

In the case of most modern internal combustion engines, it is of especial advantage to permit the engine to turn at a relatively high speed during starting since in internal combustion engines maximum torque is developed at a relatively high speed as opposed to the torque characteristic in, for example, a steam engine in which the deliverable torque is relatively uniform at low operating speeds. Furthermore, the operation of a four-cycle internal combustion engine at relatively low speeds is quite unsatisfactory due to the intermittency of the power impulses.

The conventional means for providing the increased torque in the propeller shaft during acceleration is to emp'oy a change gear transmission which is manually shifted during the initial starting of the vehicle. Further modifications of such conventional mechanisms include automatic motor means for shifting the gears, thus obviating the necessity of manual operation.

Transmissions of the type just described, while advantageous when in proper working order, include a large number of operating parts, failure of any one of which may cause the entire system to become inoperative. Still further, such devices are relatively expensive to manufacture and to keep in working order.

Bearing in mind the foregoing, it is a major object of my invention to provide a transmission of the class described which is of relatively simple construction, thus being economical to manufacture and long-wearing.

It is another object of my invention to provide a power transmission of the class described which accomplishes a reduction in shaft speed between input and output so as to permit relatively rapid acceleration.

Another object of my invention is to provide a transmission of the class described which incorporates a hydrodynamic coupling, thus to effect a smooth delivery of rotary power from a device having intermittent power strokes, such as an internal combustion engine, and to reduce the input-output shaft speed ratio at low torques.

Still another object of the invention is to provide a power transmission incorporating a hydrodynamic coupling having means to control the fluid content thereof whereby to vary the amount of rotational "slip" in such coupling.

A further object of the invention is to provide directional reversing means in a transmission of the class described which embodies the hydrodynamic coupling as a clutching and declutching means.

A still further object of the invention is to provide reversing means of the class described having hydraulic pressure actuated controls.

Yet another object of the invention is to provide reversing means of the class described which is automatically actuated in response to acceleration of an internal combustion engine above idling speed.

The foregoing and additional objects and advantages of the invention will be apparent from the following detailed description of one embodiment thereof, such consideration being given likewise to the attached drawings, wherein:

Figure 1 is an elevational section taken on an axial plane through an automotive transmission, embodying the invention;

Figure 2 is an elevational section taken on the line 2—2 in Figure 1;

Figure 3 is an elevational section taken on the line 3—3 in Figure 1, the parts being shown in forward driving condition; and Figure 4 is a view similar to Figure 3, but with the parts shown in a reverse driving condition.

In the drawings, the reference character 10 identifies a power input shaft, such for example, as the crankshaft of an internal combustion engine. The shaft 10 is provided with a terminal flange 11 secured by studs 12 and nuts 13 to a flywheel 14 having external teeth 15 for the engagement of a conventional self-starter.

The flywheel 14 is formed with an outwardly (to the right in Figure 1) extending hub 16 on which is formed a drive pinion 17. As can be seen best in Figure 2, the pinion 17 forms the sun gear of a more or less conventional planetary reduction system, having planet gears 18 in engagement with the sun gear or pinion 17, and also engaged with the internal teeth of an internally toothed ring gear 20. The planet gears 18 are rotatably carried on stud shafts 21, which shafts are supported in a spider member 22 carried for relatively free rotation on the hub 16. Additional support to the stub shafts 21 is provided by a ring-shaped member 23 pressed onto the outer ends of all the shafts 21.

The ring gear 20 is, as shown best in Figure 1, substantially cup-shaped, having a central hub 24 extending outwardly and keyed to a driven shaft 25, by conventional keys indicated at 26. The driven shaft 25 is also provided with an attachment flange 28 keyed thereto as indicated at 29. The attachment flange 28 serves to connect the driven shaft 25 to the torque tube of an automobile or other propeller shaft.

Thus far it will be noted that if the stub shafts 21, on which the planet gears 18 are carried, were to be held stationary, rotation of the drive shaft 10 in a given direction would drive the driven shaft 25 in the opposite direction and at a reduced rate, the ratio of drive being the ratio of pitch diameters of the pinion 17 and the ring gear 20, respectively. As will hereinafter be described, this is the mode of operation for reverse drive.

As opposed to the just-described mode of operation, however, it will be noted that if the planet gears 18 were prevented from rotating on their respective shafts 21, i. e., locked to the shafts, then the rotation of the drive shaft 10 would result in rotation of the driven shaft 25 in the same direction and at the same speed, the non-rotating planet gears 18 merely serving as a direct locking connection between the pinion 17 and the internal gear 20. It will also be noted that the results just described would obtain if the spider 22 in which the stub shafts 21 are carried were held against rotation with respect to the ring gear 20.

Something approaching the last-named mode of operation is achieved in the present design by coupling the ring gear 20 to the spider 22 by means of a hydrodynamic coupling comprising semi-toroidal opposed cavities 30 and 31, the former being carried in a rotary housing member 32 of semi-circular cross-section formed on the exterior of the spider 22, and the latter cavity 31 being bolted or otherwise secured to the ring gear as indicated at 33. The coupling portions 30 and 31 are formed with internal segmental partitions 34 whereby to form the impeller and runner, respectively, of a hydrodynamic coupling. Thus, when the toroidal space included within the members 30—31 is filled with liquid, rotation of the spider 22 transmits torque to the runner 31, which in turn is transferred to the ring gear member 20. An additional housing member 35 is secured to the periphery of the housing member 32 so as to form a substantially complete enclosure for the toroidal space within the coupling 30—31.

To prevent escape of the hydraulic fluid from the coupling 30—31, a rotary fluid seal 36 is secured to the inner periphery of the housing member 35 and runs against a circular extension 37 formed on the ring gear 20.

A stationary outer housing surrounding the entire transmission unit is comprised of a flat plate 40 to which is bolted a cup-shaped member 41, having a ball bearing 42 coaxially secured therein to journally support the ring gear 20 by the hub 24 thereof. An additional bearing member 43, extending outwardly from the cover member 41 and secured thereto, serves to journally support the driven shaft 25. The bearing member 43 also has integrally formed therewith the body of a valve 45, one of the purposes of which is to control the supply of liquid to the hydraulic coupling 30—31 in a manner now to be described.

As has been heretofore stated, one of the objects of the present invention is to control the amount of slip in the hydraulic coupling 30—31 by varying the amounts of hydraulic fluid therein. Hydraulic fluid under pressure is continuously supplied by a pump 50 through a fluid conduit 51 attached at a fluid connection 46 formed in the bearing member 43.

As will hereinafter be described, the fluid conduit 51 is closed under certain conditions of operation, and for this reason, a bypass valve 52 of conventional design is connected between the input and output of the pump 50, the bypass valve being of the well-known type in which increase of fluid pressure above a predetermined amount opens the valve and permits fluid to circulate through the bypass. Inasmuch as the pump and bypass serve merely the conventional purpose of supplying fluid under a constant pressure, and the design of such units being well-known in the art, they are shown only schematically herein.

The valve 45 comprises a rotatable core 48 and an operating lever 49 connected thereto, by which the core 48 can be rotated to various operative positions through the attachment of conventional (unshown) control linkage, such as is employed in automobile controls. When the valve core 48 is in the position illustrated in Figure 3, a diametrically disposed passageway 55 connects the conduit 51 with an internal passage 47 in the bearing member 43, which in turn communicates with an annular groove 48a formed in the interior of the bearing supporting the driven flange 28. As can be seen best in Figure 1, the driven shaft 25 extends into the hub 16 of the flywheel 14, being journally supported in the latter for alignment purposes.

The driven shaft 25 is centrally bored, as at 56, the ends of the bore being closed by suitable threaded plugs 57 and 58. A radial passageway 59 connects the central bore 56 with the annular groove 48a. An additional radial passageway 60 serves to discharge fluid from the axial bore 56 into the space between the flywheel hub 16 and the ring gear 20. From the interior of the ring gear 20, fluid may pass between the planet gears 18 around the rim 61 of the ring gear 20, and through a gap 62 into the interior of the fluid coupling 30—31. A number of small bleed holes 63 are formed around the periphery of the coupling housing 32—35, the bleed holes 63 being of relatively restricted size so as to permit escape of fluid at a controlled rate from the interior of the coupling 30—31 into the space surrounding the same and within the external housing 40—41. From the lower side of the housing member 41, a fluid conduit 64 delivers the fluid back to the pump 50 for recirculation in the manner just described.

The capacity of the pump 50 is such that the rate at which fluid is delivered through the conduit 51 and the connecting passageways into the coupling 30—31 is greater than the rate at which the same is discharged through the bleed holes 63. Thus, so long as the valve 45 is positioned with the opening 55 fully aligned with the conduit 51, and the passageway 47, the coupling 30—31 is kept filled with fluid. Whenever the passageway 47 is closed, however by rotating the valve 45, the fluid soon bleeds out of the coupling 30—31 into the surrounding stationary housing 41. When the housing 30—31 is rotating, the rate at which fluid is bled out of the same is relatively rapid, due to the fluid pressure produced by centrifugal force.

As has been previously explained briefly, reverse drive is achieved by holding the spider member 22 against rotation, thus causing the driven shaft to rotate in a direction opposite to the drive shaft 10, due to the interposition of the planet gears 18. In order that the spider member 22 can be conveniently gripped and thus held against rotation, the exterior of the rotary housing member 32 is formed with a cylindrical shoulder portion 70 whereby to form a brake drum.

The means for gripping the brake drum 70 and thus preventing rotation of the spider 22 are illustrated in Figures 3 and 4. A pair of diametrically opposed outwardly extending cylinders 76 formed on the exterior of the stationary housing member 41 contain a pair of brake shoe operating pistons 71, each connected by a thrust rod 72 to an arcuate brake shoe 73 having suitable lining 74 positioned to contact the exterior surface of the brake drum 70. Inasmuch as the two brake shoe mechanisms are identical in construction, only one is illustrated in the drawings.

A relatively strong thrust spring 75, positioned between the piston 71 and the housing 41, serves to hold the brake shoe 73 in a normally released position in which the lining 74 is out of contact with the drum 70. When it is desired to move the brake shoe 73 inwardly against the drum, fluid is admitted under pressure into the cylinders 76 behind the piston 71, thus forcing the same inwardly, compressing the spring 75, and clamping the brake shoe 73 against the brake drum 70. Such fluid under pressure is supplied through lateral branches of a conduit 77 to each of the cylinders 76, the two branches of the conduit 77 being connected together at a T connection 78 and in common communication through a conduit 79 with a passageway 80 in the valve 45. A diametrically disposed passageway 81 in the core member 48 of the valve member 45 is disposed at right angles to the previously described passageway 55 therein, and when positioned, as shown in Figure 4, the passageway 81 is aligned to communicate fluid to the conduit 79 and thus to the brake cylinders 76. Thus, when the control lever 49 is in the position indicated by the reference character R in Figure 1, fluid under pressure is supplied to the brake cylinders 76, and except under the conditions hereinafter to be described, the brake shoes 73 are forced in against the brake drum 70, holding the latter against rotation and resulting in reverse drive.

As previously stated, one of the objects of the present invention is to provide a control for automobile transmissions which is responsive to the speed of the engine. In this manner, it is possible to provide a system of controls in which a manually or foot operated clutch can be eliminated, and the movement of the car in a reverse direction obtained solely by operation of the accelerator pedal.

To this end, an additional bypass connection 82 is formed adjacent the outer end of a brake cylinder 76, which passageway 82 is controlled by a spool valve 83, the valve 83 in turn being controlled by a vacuum connection 84 leading to the intake manifold of the engine. The valve 83 comprises a spool 85 longitudinally movable in a stationary sleeve 86. Two rows of spaced valve ports 87 and 88 in the sleeve 86 permit fluid to enter and leave the interior of the stationary sleeve 86. Annular grooves 90 and 91 surrounding the ports 87 and 88, and a return passageway 92 leading from the annular chamber 90 into the interior of the fixed housing 41, make a continuous fluid connection from the outer end of the brake cylinder 76 into the interior of the fixed housing 41.

The passageway 82—92 is, however, under the control of the valve spool 85 which has an annular groove or recess 94 which may be positioned as shown in Figure 3 to overlap both of the rows of ports 87 and 88 so as to permit fluid to pass freely through the valve 83. When, however, the spool 85 is in its lowermost position in the sleeve 86, the upper row of ports 88 is blocked off, thus preventing the passage of fluid through the valve 83.

The upper end of the spool 85, forming a relatively close fit in the sleeve 86, acts as a piston in an actuating chamber 96 at the top of the spool 85. This chamber is closed by a threaded plug 97 which also serves as an anchor for a compression spring 98 which holds the spool normally in its lowermost position as shown in Figure 4.

During such time as the engine is in idling condition, the relatively high vacuum in the intake manifold reduces the pressure in the actuating chamber 96, thus causing the spool 85 to move upwardly, compressing the spring 98. When the throttle is opened so as to reduce the relative amount of vacuum in the intake manifold, the pressure in the actuating chamber 96 rises, permitting the spring 98 to force the spool downwardly, closing the ports 88 and thus causing the fluid pressure (if any) in the conduit 77 to force the piston inwardly, as shown in Figure 4. Whether or not there is fluid pressure in the conduit 77 will, of course, depend on the position of the valve control lever 49.

One further condition is necessary to successful operation, to-wit, the fluid admitted into the brake piston 76 must be discharged therefrom in order to release the brakes from the drum 70. If the engine is idling and the spool of the valve 83 thus in its uppermost position, as shown in Figure 3, such fluid as is contained in the cylinder 76 behind the piston 71 may escape through the passage 82—92 into the housing 41. In the event that the engine has been stopped, however, the valve spool 85 will remain in its lower position as shown in Figure 4. To enable the release of the shoe 73 when the engine is stopped, therefore, the core 48 is formed with a keyway-like recess, cut away from its exterior, as indicated at 100 in Figure 3, which cut-away recess is positioned to underlie the passageway 80 when the lever 49 is in the forward position indicated by F in Figure 1. Thus, when the transmission is in a condition for forward driving, fluid contained behind the piston 71 is forced by the action of the spring 75 back through the conduit 77—79 and the passageway 80, through the valve recess 100, and a direct passageway 101 into the interior of the housing 41.

The operation of the transmission is as follows.

Let it be assumed that the car is to start in a forward direction. The control lever 49 is accordingly moved from its normal neutral position N to the forward position F, thus aligning the passageway 55 with the conduit 51 and the fixed passageway 47, permitting fluid under the pressure of the pump 50 to pass into the space of the hydrodynamic coupling 30—31, resulting in a tendency for the driven shaft 25 to rotate in the same direction as the drive shaft 10. Such torque as is transmitted through the coupling 30—31 will have the reactive effect of holding back or resisting rotation of the spider 22. It will be seen, however, that the net effect of the torque component distributed by the pinion 17 acting directly on the ring gear 20 and the torque component delivered through the coupling 30—31 will be such as to rotate the driven shaft 25 in the same direction as the drive shaft 10 but at a reduced rate. The reduction of such rate is, of course, determined by the amount of slippage in the coupling 30—31. As the speed of the car increases, the amount of propulsive force or torque in the driven shaft 25 required to maintain movement becomes less and less, and thus the amount of slippage in the coupling 30—31 becomes less, and all of the parts of the transmission tend to rotate as a unit.

Furthermore, the amount of slippage in the hydrodynamic coupling 30—31 can be adjusted by moving the lever 49 to various positions intermediate the neutral position N, and the forward position F to modulate the flow of fluid from the pump 50.

When it is desired to drive the vehicle in a reverse direction, the lever 49 is moved to the position R, leaving the engine temporarily at idling speed. The effect thereupon is to first block the delivery of fluid through the conduit 51 to the coupling 30—31, thus emptying it and rendering it ineffective. It will be realized that even with the engine at idling speed, the time required to discharge all of the fluid in the coupling 30—31 is relatively short. Thereafter, upon accelerating the engine, the manifold vacuum will decrease (the pressure increasing), causing the control valve 83 to move to the position indicated in Figure 4, closing the ports 88 and causing the fluid pressure in the line 77, by virtue of the alignment of the valve passage 81, to enter the cylinder 76, forcing the piston 71 to the left and clamping the brake shoe 73 against the brake drum 70. Thus, in conventional fashion, the carrier 22 is held against rotation, causing the planetary drive comprising the sun gear 17, the planet gears 18, and the ring gear 20, to drive the vehicle in a reverse direction.

As soon as the throttle is closed, the reverse movement of the vehicle will slow down, the brake shoe will be released from its contact with the drum 70 due to the operation of the valve 83, and the vehicle will come to a halt, since no drive through the planetary system can be accomplished unless there is either fluid in the coupling 30—31, or alternatively, the brake shoe is clamped against the brake drum 70.

While the device shown and described herein is fully capable of achieving the objects and providing the advantages hereinbefore stated, it will be realized that it is capable of some modification without departure from the spirit of the invention. For this reason, I do not mean to be limited to the form shown and described, but rather to the scope of the appended claims.

I claim:
1. In an automotive transmission of the class described, the combination of: a drive shaft; a driven shaft; a multiple element transmission having three members drivingly engaged for interdependent rotation such that the speed of any one of its members is a function of the speeds of the other two members, a first of said members being connected to said drive shaft, and a second of said members being connected to said driven shaft; a hydrodynamic coupling connected between the third of said members and said driven shaft; fluid circulating means including a restrictive peripheral orifice in said coupling to discharge fluid therefrom, enclosure means to collect said discharged fluid, conduit means centrally connected to said coupling to return said collected fluid thereto and a valve in said conduit means to vary the amount of hydraulic fluid in said hydrodynamic coupling whereby to vary the slip thereof; and brake means operatively connected to said valve to lock said third member against rotation whereby to fix the relative speed and direction of said other two members, said brake means being inoperative except when said valve is positioned to shut off said conduit means whereby to empty said coupling of fluid.

2. In an automotive transmission of the type having a planetary drive, a hydraulic coupling adapted to transmit torque in a forward direction, and means to lock a member in said planetary drive to reverse the direction of drive therethrough, a control system comprising: a source of hydraulic fluid under pressure; conduit means including a drain orifice in said coupling to circulate said fluid through said hydraulic coupling; a hydraulic motor operatively connected to said locking means to move the same into locking position; conduit means to deliver fluid to said motor; and unitary valve means to control the flow of said fluid, characterized in that fluid is delivered to said motor only when said circulation is shut off to empty said hydraulic coupling of fluid.

3. In an automotive transmission of the class described, the combination of: a drive shaft; a driven shaft; a sun gear secured to said drive shaft; a plurality of planet gears meshed with said sun gear; a ring gear meshed with said planet gears and secured to said driven shaft; a spider supporting said planet gears for orbital rotation thereof, said spider having an external brake drum formed thereon; a hydrodynamic coupling connected between said spider and driven shaft; fluid circulating means including a drain orifice in said coupling, conduit means positioned to receive fluid discharged through said orifice and return the same to said coupling, and one section of a multiple section valve interposed in said conduit means to vary the amount of hydraulic fluid in said hydrodynamic coupling whereby to vary the slip thereof; a brake shoe positioned and adapted to engage said brake drum to lock the same against rotation; a hydraulic motor to operate said brake shoe; and conduit means connected between said fluid circulating means and said fluid motor through another section of said valve, characterized in that said fluid is delivered to said motor to operate said shoe only when said valve is positioned to shut off the flow of fluid to said hydrodynamic coupling whereby to empty the latter of fluid.

4. In combination with an internal combustion engine, a transmission comprising the combination of: a drive shaft; a driven shaft; a multiple element transmission having three members drivingly engaged for interdependent rotation such that the speed and direction of any one of said members is a function of the speeds and directions of the other two members, a first of said members being connected to said drive shaft, a second of said members being connected to said driven shaft, and the third of said members having a brake drum formed thereon; a movable brake shoe positioned and adapted to move into engagement with said drum to lock said third member whereby to fix the relative speed and direction of said other two members; a hydraulic motor having an expansible chamber with a movable wall portion movable in response to pressure in said chamber, said wall portion being connected to move said shoe as aforesaid; a fluid pump; a bypass conduit connected between the intake and exhaust of said pump; a pressure relief valve in said bypass conduit to permit return of fluid through said bypass whenever the fluid pressure at the exhaust of said pump exceeds a predetermined value; input conduit means to deliver fluid from said pump to said chamber; return conduit means to deliver fluid from said chamber to said pump; and control means for said motor including a manually operable valve in said input conduit means and a pressure actuated valve in said return conduit means, said pressure actuated valve being connected to the intake manifold of said engine and responsive to pressure therein to block said return passage during relatively low vacuum in said manifold and open said return conduit means during relatively high vacuum in said manifold whereby opening of said manually operable valve serves to deliver fluid into said chamber to move said shoe, but said shoe is moved only if said engine is running at above idling speed whereby to reduce the degree of vacuum in said manifold to actuate said pressure actuated valve and close said return conduit means.

5. In combination with an internal combustion engine, a transmission comprising the combination of: a drive shaft; a driven shaft; a multiple element transmission having three members drivingly engaged for interdependent rotation such that the speed and direction of any one of said members is a function of the speeds and directions of the other two members, a first of said members being connected to said drive shaft, a second of said members being connected to said driven shaft, and the third of said members having a brake drum formed thereon; a hydrodynamic coupling connected between said third member and said driven shaft; a movable brake shoe positioned and adapted to move into engagement with said drum to lock said third member whereby to fix the relative speeds and directions of said other two members; a hydraulic motor having an expansible chamber with a movable member thereof connected to move said shoe as aforesaid; a fluid pump; a bypass conduit connected between the intake and exhaust of said pump; a pressure relief valve in said bypass conduit to permit return of fluid to the input of said pump whenever the fluid pressure at the exhaust of said pump exceeds a predetermined value; fluid circulating means to deliver fluid from said pump through said coupling and back to said pump, said circulating means including a restricted orifice downstream from said coupling whereby the amount of fluid retained in said coupling is dependent on the rate of flow through said circulating means; input conduit means to deliver fluid from said pump to said chamber; return conduit means to deliver fluid from said chamber to said pump; a manually operable multiple section valve having a first normally open section included in said fluid circulating means, and a second normally closed section included in said input conduit means, whereby movement of said valve from a normal position closes said fluid circulating means to empty said coupling, and simultaneously opens said input conduit means to deliver fluid to said chamber; and a pressure actuated valve in said return conduit means, said pressure actuated valve being connected to the intake manifold of said engine and responsive to pressure therein to block said return passage during relatively low vacuum in said manifold and open said return conduit means during relatively high vacuum in said manifold, whereby moving said manually operable valve from a normal position as aforesaid is effective to move said shoe into engagement with said drum only if said engine is running at above idling speed whereby to reduce the degree of vacuum in said manifold to actuate said pressure actuated valve to close said return conduit means.

6. In an automotive transmission of the class described: a drive shaft; a driven shaft positioned in abutting coaxial extension of said drive shaft; a pinion fixed to the end of said drive shaft; a spider journaled on said drive shaft and having a plurality of fixed stub shafts parallel to said drive shaft and at equal radial distances therefrom; a planet gear journaled on each of said stub shafts and meshed with said pinion; an internally toothed ring gear secured by a hub portion thereof to said driven shaft and meshed with all of said planet gears, a toroidal hydraulic coupling surrounding said drive and driven shafts substantially at the juncture thereof, said coupling comprising opposed bladed cavity sections, one carried by said spider and the other carried by said ring gear; a rotary housing carried by said spider and surrounding said coupling section to form a fluid enclosure for the same, said rotary housing having a restrictive peripheral orifice to discharge fluid from said enclosure at a predetermined rate; a fixed housing surrounding said rotary housing to collect said discharged fluid; a pump adapted to circulate hydraulic fluid under pressure; a bypass connected between the intake and exhaust of said pump, said bypass having a pressure relief valve therein whereby to maintain a given maximum pressure at the exhaust of said pump; a delivery conduit connected between the exhaust of said pump and the interior of said enclosure to deliver said fluid under pressure thereinto; a return conduit connected between said fixed housing and the intake of said pump to return said collected fluid to said pump; and a manually operable control valve in said delivery conduit to control the rate of fluid flow therethrough whereby to adjust the amount of fluid and hence the slip in said coupling.

7. In an automotive transmission of the class described: a drive shaft; a driven shaft positioned in abutting coaxial extension of said drive shaft; a pinion fixed to the end of said drive shaft; a spider journaled on said drive shaft and having a plurality of fixed stub shafts parallel to said drive shaft and at equal radial distances therefrom; a planet gear journaled on each of said stub shafts and meshed with said pinion; an internally toothed ring gear secured by a hub portion thereof to said driven shaft and meshed with all of said planet gears; a toroidal hydraulic coupling surrounding said drive and driven shafts substantially at the juncture thereof; said coupling comprising opposed bladed cavity sections one carried by said spider and the other carried by said ring gear; a rotary housing carried by said spider and surrounding said coupling section to form a fluid enclosure for the same, said rotary housing having a restrictive peripheral orifice to discharge fluid from said enclosure at a predetermined rate; an external brake drum formed on said rotary housing; a fixed housing surrounding said rotary housing to collect said discharged fluid; at least one radially disposed fluid cylinder formed in said fixed housing outwardly adjacent said drum; a piston in said cylinder; a brake shoe in said fixed housing connected to said piston to be moved thereby into contact with said drum to lock said spider against rotation; a pump adapted to circulate hydraulic fluid under pressure; a bypass connected between the intake and exhaust of said pump, said bypass having a pressure relief valve therein whereby to maintain a given maximum pressure at the exhaust of said pump; a first delivery conduit connected between the exhaust of said pump and the interior of said enclosure to deliver said fluid under pressure thereinto; a return conduit connected between said fixed housing and the intake of said pump to return said collected fluid to said pump; a second delivery conduit connected to deliver fluid from said pump into said cylinder; and a unitary manually operable control valve having a section in each of said delivery conduits, said sections being arranged so that one is closed when the other is open whereby movement of said valve to close said first conduit and empty said enclosure of fluid opens said second conduit to deliver fluid into said cylinder to move said piston and shoe and lock said spider.

8. An automotive transmission of the type having a reversible mechanical transmission, a hydraulic coupling connected to said transmission and adapted to transmit torque in a forward direction, and a member in said mechanical transmission movable between alternate positions to effect selectively, forward or reverse direction drive through said mechanical transmission, a control system comprising in combination: a source of hydraulic fluid under pressure adapted to deliver fluid at a given rate; a conduit connected between said source and coupling to fill the latter with fluid; discharge means including a flow-restrictive orifice in said coupling to drain fluid therefrom at less than said given rate; a valve in said conduit movable from a full open position to a closed position to restrict fluid flow through said conduit; actuator means to move said transmission member from one of said alternate positions to the other; and coordinating means coupled between said actuator means and valve whereby the latter is always full open when said transmission member is in a given one of said alternate positions and closed when said transmission member is in the other alternate position.

9. The construction of claim 8 further characterized in that said source is a pump connected to receive fluid from said discharge means.

10. The construction of claim 8 further characterized in that said actuator means comprises a fluid motor connected to receive fluid from said source.

11. The construction of claim 10 further characterized in that said coordinating means consists in a second valve interposed in the fluid connection of said fluid motor and mechanically coupled to said first valve for concurrent movement therewith.

12. In an automotive transmission of the type having a planetary drive, a hydraulic coupling adapted to transmit relatively low torques at relatively high speed, and means to lock a member in said planetary drive to change the torque-speed ratio thereof, a control system comprising: a source of hydraulic fluid under pressure; conduit means including a drain orifice in said coupling to circulate said fluid through said coupling; a hydraulic motor operatively connected to said locking means to move the same into locking position; conduit means to deliver fluid to said motor; and unitary valve means to control the flow of said fluid characterized in that fluid is delivered to said motor only when said circulation is shut off to empty said coupling of fluid.

JULIAN S. BROWN.

REFERENCES CITED

The following references are of record in the file of this patent:

UNITED STATES PATENTS

| Number | Name | Date |
|---|---|---|
| 1,950,700 | Simmen | Mar. 13, 1934 |
| 2,067,793 | Seibold | Jan. 12, 1937 |
| 2,089,590 | Walti | Aug. 10, 1937 |
| 2,092,256 | Kliesrath | Sept. 7, 1937 |
| 2,131,619 | Duffield | Sept. 27, 1938 |
| 2,224,884 | Schneider et al. | Dec. 17, 1940 |
| 2,240,650 | Heyer | May 6, 1941 |
| 2,377,009 | Heyer | May 29, 1945 |
| 2,494,466 | Wolf | Jan. 10, 1950 |